GEORGE A. ALTGELT
INVENTOR.

BY
*John C. Stahl*
ATTORNEY

GEORGE A. ALTGELT
INVENTOR.

BY John C. Stahl

ATTORNEY

# United States Patent Office 3,445,914
Patented May 27, 1969

3,445,914
METHOD OF REPAIRING AIRCRAFT CYLINDER HEADS
George A. Altgelt, San Antonio, Tex., assignor to Chrome Plate, Inc., San Antonio, Tex., a corporation of Texas
Continuation-in-part of application Ser. No. 468,779, July 1, 1965, now Patent No. 3,246,392. This application Apr. 18, 1966, Ser. No. 543,321
Int. Cl. B23p 7/04, 17/00
U.S. Cl. 29—402      13 Claims

ABSTRACT OF THE DISCLOSURE

A method of repairing damaged aluminum castings comprising the steps of preheating a casting to a temperature ranging from 250° to 1,000° Fahrenheit dependent upon the thickness of the portion undergoing repair, heating the damaged portion until such portion begins to become fluid, welding the damaged portion with inert gas shielding to provide complete fusion with the casting and stress relieving the casting.

---

This application is a continuation-in-part of application Ser. No. 468,779, filed July 1, 1965, for Method of Repairing Aircraft Cylinder Heads, now United States Letters Patent No. 3,246,392.

The present invention relates to a method of repairing aircraft cylinder heads and more particularly to a method of repairing damaged aluminum aircraft cylinder heads and parts thereof whereby the cylinder head may be returned to serviceable condition.

The shortage of parts for certain aircraft and the great expense of such parts, even when available, makes it imperative that many parts formerly disposed of be reworked and reused, where practicable. The subject invention pertains to the reworking and reclamation of worn, cracked, broken and otherwise unservicebale aircraft cylinder heads and other aluminum castings, aimed at restoring them to a condition which will enable them to perform satisfactorily.

The subject invention relates to inert-gas shielded, arc welding of preheated aluminum cylinder heads and castings. Properly preheated aluminum castings are relatively stress free and show no evidence of thermal shock after being welded. Coalescence of the filler material with the base material is produced by heating the base material with an electric arc between a metal electrode and the work. Shielding is obtained from an inert gas, such as argon or helium, of high purity—this prevents oxidation of the weld material.

There is only a very small percentage, not exceeding four percent, of non-repairable damage to aircraft cylinder heads which cannot be corrected utilizing the aforementioned process. These non-repairable damages include faulty casings or cylinder head cracks resulting from excessive porosity, cylinder head corrosion, loose fitting cylinder head to barrel, combustion leaks at barrel and head connections, and casting fissures or cracks located in positions where they are physically impossible to reach. Damages to cylinder heads not falling within one of these categories normally may be repaired utilizing the process of the subject invention.

An object of the present invention is the provision of a method of repairing aluminum cylinder heads and castings of aluminum.

Another object is to provide a method for reworking damaged parts of an aluminum cylinder head.

A further object of the invention is the provision of a method whereby damaged aluminum cylinder heads may be repaired and returned to serviceable condition at substantially less cost than the replacement thereof.

Still another object is to provide a method whereby a damaged part may be repaired and returned to use when a replacement part is not readily available.

Other objects and features of the invention will become apparent to those skilled in the art as the disclosure is made in the following detailed description of preferred embodiments of the invention as illustrated in the accompanying sheets of drawing in which.

Figure 1:
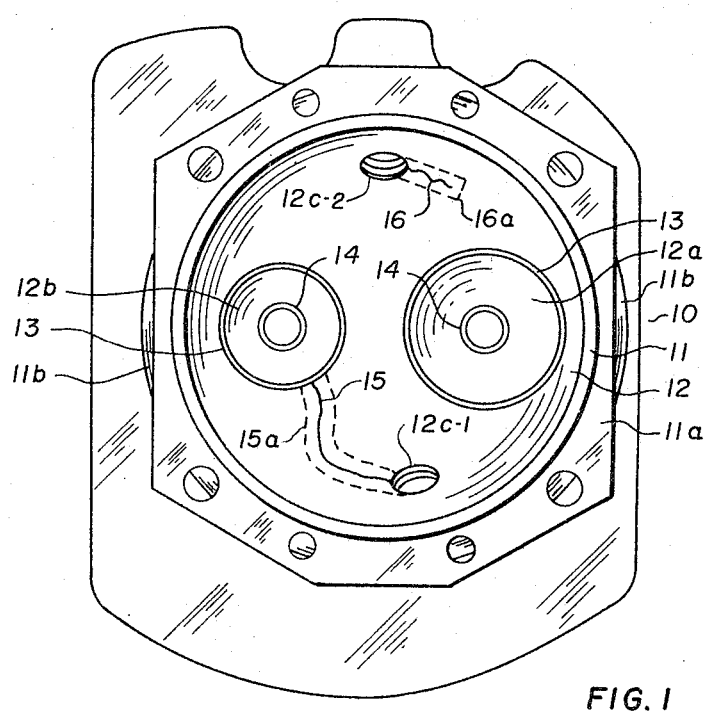
FIG. 1 is a top plan view looking into the barrel of an aircraft cylinder head, showing a crack occurring between a spark plug boss and the exhaust seat and a second crack in proximity to the second spark plug boss.

Referring now to the drawings, wherein like reference characters designate like or corresponding parts throughout the several views, there is shown in FIG. 1 an aircraft cylinder 10 consisting of a barrel 11 and cylinder head 12. Barrel 11 is composed of chrome-molybdenum steel or the like and includes a flange 11a and cooling fins 11b on the outer surface thereof.

Cylinder head 12 is composed of cast or forged aluminum and as viewed in FIG. 1 includes an inlet port 12a, exhaust port 12b and spark plug boss 12c–1—12c–2 into which screwingly insert helicoils (not shown). Valve seats 13, composed of steel, and valve guides 14, composed of bronze or the like, are installed in the cylinder head 12 at the factory as is barrel 11 which is attached to the cylinder head. Cylinder head cracks or damage extending to areas adjacent to the valve seats, valve guides, spark plug bushings or helicoils must have these parts removed in order to complete the inspection and repair of the damage, as will hereinafter be described in detail.

INSPECTION

In practicing the invention, all paint and carbon deposits are to be removed from the cylinder head or casting, both internally and externally. Any commercially-available cleaning material suitable for use with both aluminum and steel, as for example, "Carbostrip" manufactured by Turco Products, Inc., Newark, N.J., may be utilized. The casting is then blasted, both internally and externally, utilizing sand, walnut hulls or glass beads and conventional apparatus.

The casting is then preheated to 175°–200° Fahrenheit and inspected by conventional dye-penetrant or fluorescent type inspection methods, as for example, the "Dy-Chek" and "Zyglo" processes, to determine the type and locations of cracks or damage. "Dy-Chek" is a dye-penetrant manufactured by Turco Products, Inc., of Newark, N.J.; the process is covered by United States Letters Patent Nos. 2,667,070 and 2,764,556.

The cylinder head or casting may also be immersed in a solution of chromic acid (33 ounces/gallon) and heated to 144°±5° Fahrenheit for approximately one hour after which the cylinder is rinsed in water and heated to 450° Fahrenheit. Beads of reddish-brown color outline the limits of the crack.

As heretofore mentioned, valve seats, valve guides, spark plug bushings and helicoils must be removed in order to complete the inspection and repair if the damage is in proximity to such parts. Cylinder heads with damage resulting from broken valves must have both valve seats removed before inspection.

REPAIR

There is shown in FIG. 1 of the drawings examples of internal spark plug boss damage. The crack 15, for example, extends from the spark plug boss 12c–1 to the valve seat 13 on the exhaust port 12b while crack 16 radiates from spark plug boss 12c–2. Cracks 15 and 16, if occurring in the same cylinder head, may be repaired simultaneously. Preferably, however, the smaller crack or lesser damage is repaired first; in the event that there are several cracks in the cylinder head it has been found convenient to first repair the most accessible crack or damaged area.

All material immediately bounding the crack or cracks is removed in any suitable manner as by drilling or using a rotary file to form a channel. The channel must be U-shaped in section, preferably of uniform depth and width, with the side walls and bottom surfaces smooth. If the crack extends into the seat boss, as exemplified by crack 15, the channel is to be cut open to the seat boss as shown in dotted line portions 15a. Where the crack does not extend into the seat boss, however, as exemplified by crack 16, the end of the channel is to be bevelled at an angle of 30° which terminates in the cylinder head surface.

Barrel 11 is then placed over a shielded gas burner or placed in an electric oven and the part to be repaired is preheated to a temperature determined by the thickness of such part, as indicated in Table I, to prevent thermal shock. A conventional temperature stick or other temperature indicating means may be utilized to determine when the desired temperature has been reached.

TABLE I

| Metal thickness, inches | Temperature, degrees Fahrenheit | |
|---|---|---|
| | Minimum | Maximum |
| 1/8 | 250 | 300 |
| 3/16 | 300 | 350 |
| 1/4 | 350 | 400 |
| 5/16 | 400 | 450 |
| 3/8 | 450 | 500 |
| 7/16 | 500 | 550 |
| 1/2 | 550 | 600 |
| 9/16 | 600 | 650 |
| 5/8 | 650 | 700 |
| 11/16 | 700 | 750 |
| 3/4 | 750 | 800 |
| 13/16 | 800 | 850 |
| 7/8 | 850 | 900 |
| 15/16 | 900 | 950 |
| 1 | 950 | 1,000 |

The cylinder 10 is next suitably supported whereby the damaged portions are conveniently accessible. The area in proximity to the crack or damage to be repaired is heated with a #8 oxy-acetylene torch until the area where the weld is to begin becomes fluid. An inert-gas, shielded torch, such as "Heliweld," manufactured by Airco of New York, N.Y., is then utilized to weld this area, using an uncoated aluminum filler rod. A rod containing the same basic components as the base metal should be selected. Sufficient metal must be deposited to permit machining of the repaired portions to the original dimensions. There is shown in Table II recommended current ratings and gas flow for repairing various thicknesses of metal, as given in inches.

TABLE II

| Metal thickness, inches | Tungsten electrode diameter, inches | Alternating current with high frequency and D.C. component | |
|---|---|---|---|
| | | Current range, amperes | Argon flow, cu. ft./hr. |
| 1/16 | 1/16 | 60–80 | 10–15 |
| 3/32 | 1/16–3/32 | 75–125 | 14–18 |
| 1/8 | 3/32 | 125–160 | 15–18 |
| 3/8 | 3/16–1/4 | 330–380 | 19–29 |
| 1/2 | 3/16–1/4 | 350–400 | 30 |
| 3/4 | 1/4 | 550–600 | 30 |

It is to be understood that although the use of high purity argon has been specified in Table II, the invention is not restricted solely to the use of such inert gas; castings can be welded utilizing either argon or helium with approximately equal success; however, approximately twice a smuch helium as argon is used per hour for equally effective shielding. Helium gas gives deeper penetration whereas argon gas gives better coverage. Helium and argon gases mix readily and a mixture of the two gases, in equal proportions, provides advantageous results. Furthermore, when welding with alternating current, straight polarity, although an argon atmosphere is not as hot as helium the arc length can be changed without appreciably changing the heat input to the work whereas with helium a small variation in arc length will result in a greater variation in arc voltage than with argon.

Conventional gas control equipment is utilized to provide a uniform flow of the desired quantity of such inert gas.

Heavy cast aluminum or materials one-quarter inch or more in thickness require multiple beads for maximum strength. Medium sized beads are preferred for general purpose welding as they give a better appearance, maximum strength and reduce the amount of finishing work. The first pass should be a root weld which provides complete fusion at the bottom of the U-shaped channel. To increase the desity of all welds of the subject process, the root weld and each successive bead or weld is to be hammer peened immediately after the weld is completed, with the work piece at a temperature ranging from 500° to 800° Fahrenheit. The entire weld and the adjacent area is peened with a pneumatic hammer, air chisel or the like capable of operating at 1,000 to 2,000 strokes per minute, and providing from 200 to 1,600 pounds impact. Obviously, the time required for peening is dependent upon the size of the repair; generally to effectively peen an area of one square inch approximately thirty seconds is required. To peen the weld of the average repair requires from twenty to forty-five seconds. Each successive bead may be deposited if the cylinder head or other casting remains at preheated temperatures; if the temperature of the part undergoing repair falls below the minimum temperature specified in Table I, as determined by the thickness of such part, the cylinder head must be reheated.

The remaining cracks or damage is to be repaired in like manner. After all damage has been repaired the cylinder is allowed to return to ambient temperature slowly. A rotary file, fly-cutter or other suitable means is utilized to rework and shape the cllinder head to its original configuration. The cylinder head is heated to 175°–200° Fahrenheit over a gas flame or the like and the cylinder head checked with a dye-penetrant or fluorescent type inspection.

In the processes of applicant's prior inventions, United States Letters Patent Nos. 3,192,618 and 3,246,392, if such inspection reveals no cracks, the cylinder head is reheated to approximately 550° Fahrenheit and allowed to heat soak at such temperature for approximately forty-five minutes to stress relieve the cylinder. Thereafter the cylinder is permitted to air cool slowly and is checked once again, using the aforementioned dye-penetrants or fluorescent type inspection methods.

Alternatively, after the cylinder head is repaired and the weld machined in the manner heretofore described, the repaired portion and areas adjacent thereto are peened at ambient temperature by shot peening to stress relieve the surface of such piece.

Peening, in general, compacts the surface and the part undergoing repair, thereby effectively increasing the "endurance life" and providing greater fatigue resistance of such part. In shot peening, the peening shot acts as a tiny ball hammer, stretching the surface radially. The total effect of the many tiny "hammers" is to present a surface which is in residual compression, while fibers immediately under the surface are in tension from the depressed surface. The effect of flexing is to relieve compression on the surface and return the inner fibers to normal, thereby extending fatigue resistance.

As is well known, factors which govern correct peening intensity of any specific metal part include the size, velocity, cleanliness, direction and quality of the shot, and coverage.

"Rotoblast" or "Airblast" equipment, such as is manufactured by Pangborn Corporation of Hagerstown, Md., or similar equipment, is utilized for such shot peening. The "Rotoblast" wheel discharges from 100 to 600 pounds of shot per minute in a long, narrow stream of non-uniform intensity throughout its length. The "Airblast" requires compressed air for its operation and shot is forced by air through a nozzle, forming a concentrated stream of impact.

It is to be understood that repairs to cylinder heads and castings can be made by preheating the piece to the temperature specified in Table I, after which the damaged part is welded in the manner heretofore described and the said piece thereafter slowly cooled to ambient temperature without a heat soak or peening step.

The cylinder barrel 11 is then ground oversize and chrome plated by any conventional process, thus restoring the complete cylinder assembly to the manufacturer's new limits. To insure that all loose metal particles have been removed, the cylinder may then be electro-cleaned whereby a reverse current, varying from 2–3 amperes/sq. inch of inner surface area of the barrel, is passed through the cylinder for approximately 30–45 seconds.

When damage occurs to the spark plug boss threads under a helicoil it is necessary to first remove the helicoil after which the spark plug boss is bored out to remove all threaded portions. The cylinder head is then preheated to 600°–650° Fahrenheit after which the internal spark plug boss is welded over as heretofore described using a "Heliweld" torch operating at the current specified in Table II, as determined by the thickness of such portions; the cylinder head is then inverted and the external spark plug boss area is welded and hammer peened in the manner heretofore described. New threads are bored and tapped, the spark plug seat is spot faced and the internal spark plug boss recontoured to its original configuration. If the repair inspection is satisfactory, the cylinder is reheated and rechecked in the manner heretofore described after which the cylinder head is shot peened with glass beads for approximately forty-five seconds.

When the cylinder head is damaged by broken valves it is necessary to remove the valve seats before inspection and repair. All damaged portions of the cylinder head are removed as by using a rotary file or the like; the channel thus provided must be equal or greater in width than in depth. Each end of the channel is to be bevelled at an angle which may vary from 15° to 45°; if the damage extends into either valve seat boss or spark plug boss, however, the channel is to be cut open and extend thereinto. After preheating the cylinder head to the specified temperature, as determined by the thickness, the channel is welded with a "Heliweld" torch operating at the current specified in Table II; successive beads are hammer peened as heretofore described. After all repairs have been made and the cylinder head is allowed to return to ambient temperature, the inside of the combustion chamber is machined to the original configuration. If the inspection is satisfactory, the valve seat bosses are bored to accommodate oversize valve seats. The cylinder head is then reheated, rechecked in accordance with the teachings of the invention and thereafter glass shot peened for approximately forty-five seconds.

Figure 2:
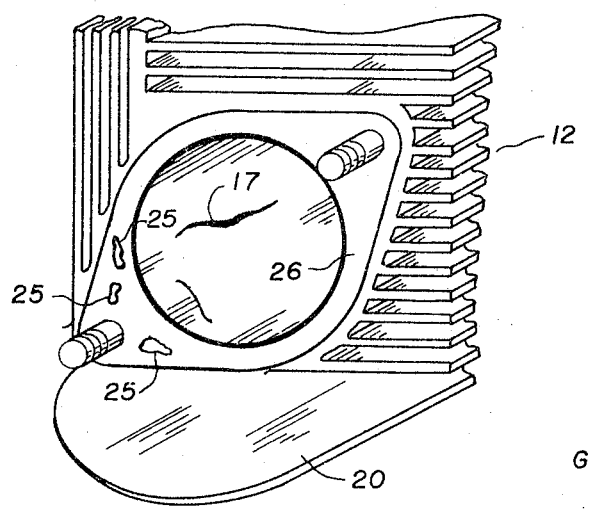
FIG. 2 is an isometric view looking into the exhaust port of an aircraft cylinder head showing a crack therein and an eroded area on the mating surface.

There is shown in FIG. 2 of the drawings a crack 17 in the internal exhaust port of the cylinder head. Such a crack, of any length, may be repaired in accordance with the principles heretofore specified provided that the crack surfaces at least one-quarter inch from the inside diameter of the valve guide boss or one-quarter inch from the valve seat boss and the crack is not more than one-quarter inch in depth. The crack is removed with a rotary file or the like; after preheating the cylinder head to the temperature specified in Table I, determined by the thickness of the part undergoing repair, the cylinder head is supported with the crack preferably in an essentially horizontal plane. The damage is repaired with the "Heliweld" torch operating within the current range specified in Table II and successive beads or welds hammer peened at a temperature ranging from 500°–800° Fahrenheit. The cylinder head is allowed to air cool slowly after which the inside of the repaired port area is recontoured to the original shape, rechecked, and then shot peened with glass beads in the manner heretofore described.

Figure 3:
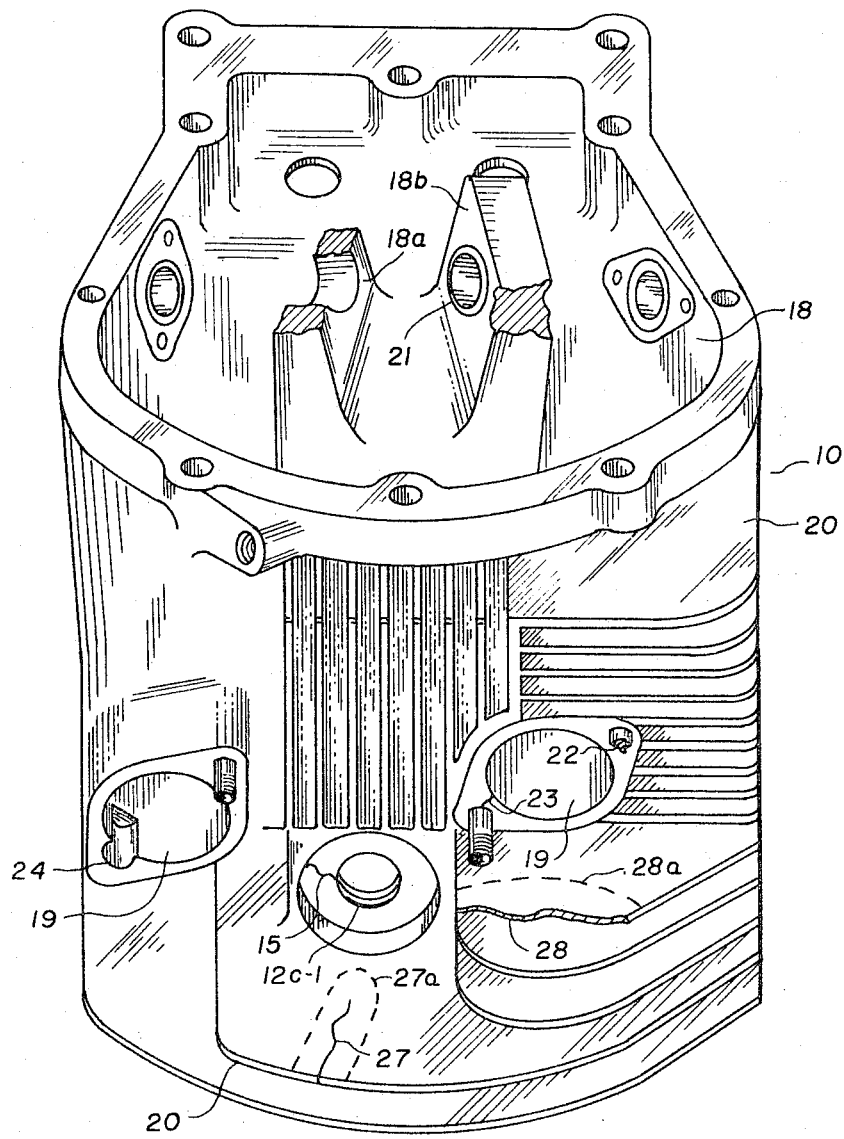
FIG. 3 is a fragmentary, 45° pictorial view showing damage to the rocker box assembly, a crack in the external sprak plug boss, a broken exhaust port stud, and broken and cracked cooling fins.

The cylinder head 12, as best seen in FIG. 3 of the drawings, includes a rocker box section 18, ports 19 and cooling fins 20. As often occurs, the rocker shaft bosses 18a–18b may be damaged or broken. In FIG. 3, boss 18a is completely broken off while only a portion of boss 18b has been damaged. In those cylinders including inserts 21, such parts must be removed from the damaged boss prior to inspection and repair. With a rotary file or the like the remainder of the broken boss 18a is removed to provide a smooth surface; if required, a U-shaped channel may be provided in the surface of the rocker box section. The cylinder head is inspected and preheated in the manner heretofore described. In welding, deep penetrating passes must be made with the torch until the foundation weld is completed, after which it is necessary to continue to weld beads one upon another, with hammer peening between successive beads, until the rocker boss is of the desired unfinished dimensions. After the cylinder head has returned to ambient temperature the rocker boss is milled to the original dimensions and as required, rotary filed to finish the outside surfaces. The rocker boss shaft hole is located, drilled and reamed in accordance with the manufacturer's specifications. The reheating, rechecking, and glass shot peening steps are then to follow.

Referring again to FIG. 3 of the drawings, there is shown a broken exhaust port stud 22 and a crack 23 radiating from the second stud. Both of these repairs may be made in accordance with the teachings of the subject invention. In the event that the stud 22 may conveniently be removed but the threads are stripped or pulled, the damaged threads are milled out preparatory to welding. In those cases where the studs have been broken off at or below the surface of the exhaust port and cannot be removed and in those cases where there is other damage in proximity to a stud, as exemplified by crack 23, it is necessary to remove the lower portion of the stud and the material bounding the crack as by drilling or using a rotary file. A semi-circularly shaped cut 24 is to be made, said cut extending into the inside of the port, as illustrated in FIG. 3; the cut must be 2½ times greater in width than the diameter of the stud and should extend below the lower limit of the stud or threaded portions. Such type cut provides for easy removal of broken studs, stud inserts, or broken or damaged threads. The remaining steps of the process may then be completed, including hammer peening between successive welds or beads, after which the desired position may be drilled and taped to accommodate a standard stud; any additional machine work may also be completed to return this portion of the cylinder head to its original configuration and the said cylinder head glass shot peened, at ambient temperature.

Damaged aluminum crank cases, excluding the webs and supporting structures, may also be repaired in accordance with the teachings of the invention.

Minor repairs to aircraft cylinder heads include eroded areas on mating surfaces, damaged or broken cowling lugs and cracked or broken cooling fins. For example, the eroded area 25 on mating surface 26 (see FIG. 2) is removed by rotary filing or the like; the cavity thus formed is then welded in the manner heretofore described after which the surface is machined to its original configuration.

Damaged or broken cowling lugs (not shown) may be repaired by building up the damaged or broken portions as by welding with hammer peening at a temperature ranging from 500° to 800° Fahrenheit between successive beads or welds; the lug is machined and if necessary, redrilled, followed by the glass shot peening step.

As best seen in FIG. 3 of the drawings, a crack 27 occurs in a cooling fin and the outermost portion of a second fin has been broken off, as indicated by reference numeral 28. The cracked or broken portions of the fins are removed beyond the depth of the crack or break as by means of a thin rotary file or other conventional apparatus to provide a smooth edge; the crack 27 is to be reworked to the dotted line portions 27a while the broken edge of a fin is to be reworked to provide a smooth, even surface, as shown by dotted line portions 28a. The removed areas of the fins are then built back to the required unfinished dimensions after which the repaired portions may be machined to the original configuration and such repair glass shot peened for 20–30 seconds. Alternatively, a suitable support may be inserted between adjacent fins to provide a surface upon which the newly deposited weld may be supported. Support means is also required where an attempt is made to join a broken portion to the basal portion of the fin.

If any of the aforementioned repairs are rejected due to a positive dye-penetrant or fluorescent type inspection, all areas adjacent to the repair are to be reinspected for possible stress cracks. A drill or rotary file may be used to determine the depth of the faulty repair. If such inspection reveals no detrimental thermal shock, the part may again be repaired in accordance with the aforementioned steps. However, if such inspection reveals stress cracks resulting from such repairs, the cylinder head or casting must be rejected.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

Having thus described the invention, what is claimed is:

1. A method of repairing damaged aluminum castings comprising the steps of
    removing all material bounding the damaged portion of the casting,
    preheating the casting to a temperature ranging from 250° to 1,000° Fahrenheit dependent upon the thickness of the said damaged portion,
    welding the damaged portion to provide complete fusion with said casting utilizing an inert gas and a filler rod of essentially the same composition as the casting,
    allowing the casting to return to ambient temperature slowly.

2. A method of repairing damaged aluminum castings comprising the steps of
    removing all material bounding the damaged portion of the casting,
    preheating the portion of the casting where the damage occurs to a temperature ranging from 250° to 1,000° Fahrenheit dependent upon the thickness of such portion,
    welding the damaged portion to provide complete fusion with said casting utilizing an inert gas and a filler rod of essentially the same composition as the casting,
    allowing the casting to return to ambient temperature slowly.

3. A method of repairing damaged aluminum castings comprising the steps of
    removing all material bounding the damaged portion of the casting,
    preheating the portion of the casting where the damage occurs to a temperature ranging from 250° to 1,000° Fahrenheit dependent upon the thickness of said portion,
    welding the damaged portion to provide complete fusion with said casting utilizing an inert gas and a filler rod of essentially the same composition as the casting,
    allowing the casting to return to ambient temperature slowly,
    reworking the repaired portion to return the casting to its original configuration.

4. A method of repairing damaged aluminum castings comprising the steps of
    removing all material bounding the damaged portion of the casting,
    preheating the damaged portion of the casting to a temperature of 250° to 1,000° Fahrenheit dependent upon the thickness of said portion,
    welding the damaged portion to provide complete fusion with said casting utilizing an inert gas and a filler rod of essentially the same composition as the casting,
    allowing the casting to return to ambient temperature slowly,
    reworking the casting to return the casting to its original configuration,
    peening the casting.

5. A method of repairing damaged aluminum castings comprising the steps of
    removing all material bounding the damaged portion of the casting,
    preheating the damaged portion of the casting to a temperature of 250° to 1,000° Fahrenheit dependent upon the thickness of said damaged portion,
    heating the damaged portion of the casting until said portion begins to become fluid,
    welding the damaged portion to provide complete fusion with said casting utilizing an inert gas and a filler rod of essentially the same composition as the casting,
    peening the welded portion while such welded portion is at a temperature ranging from 500° to 800° Fahrenheit.

6. A method of repairing damaged aluminum castings comprising the steps of
    removing all material bounding the damaged portion of the casting,
    preheating the damaged portion of the casting to a temperature ranging from 250° to 1,000° Fahrenheit dependent upon the thickness of said damaged portion,
    heating the damaged portion of the casting until said portion begins to become fluid,
    welding the damaged portion to provide complete fusion with the casting utilizing an inert gas and a filler rod of essentially the same composition as the casting,
    peening the welded portions and the areas adjacent thereto while such welded portion is at a temperature ranging from 500° to 800° Fahrenheit,
    reworking the casting to return the said casting to its original configuration,
    shot peening the casting at ambient temperature.

7. A method of repairing damaged aluminum castings comprising the steps of
    removing all material bounding the damaged portion of the casting,
    preheating the damaged portion of the casting to a temperature ranging from 250° to 1,000° Fahrenheit dependent upon the thickness of such damaged portion,
    heating the damaged portion to a temperature at which such damaged portion begins to become fluid,
    welding the damaged portion to provide complete fusion with said casting utilizing an inert gas and a filler rod of essentially the same composition as the casting,
    hammer peening each weld when such weld is at a temperature of at least 500° Fahrenheit but not exceeding 800° Fahrenheit.

8. A method of repairing damaged aluminum castings comprising the steps of removing all material bounding the damaged portion of the casting, preheating the damaged portion of the casting to a temperature of 250° to 1,000° Fahrenheit dependent upon the thickness of such damaged portion, heating the damaged portion of the casting to a temperature at which the damaged portion begins to become fluid, welding the damaged portion to provide complete fusion with said casting utilizing an inert gas and a filler rod of essentially the same composition as the casting, hammer peening the welded portions and the adjacent areas thereto while such welded portion is at a temperature ranging from 500° to 800° Fahrenheit, reworking the casting to return the said casting to its original configuration, shot peening the casting at ambient temperature.

9. A method of repairing damaged aluminum castings comprising the steps of removing all material bounding the damaged portion of the casting, preheating the casting to at least 250° Fahrenheit, welding the damaged portion of the casting to provide complete fusion with the casting utilizing an inert gas and a filler rod of essentially the same composition as the casting, cooling the casting slowly.

10. A method of repairing damaged aluminum castings comprising the steps of removing all material bounding the damaged portion of the casting, preheating the casting to at least 250° Fahrenheit, heating the damaged portion of the casting until such portion begins to become fluid, welding the damaged portion to provide complete fusion with said casting utilizing an inert gas and a filler rod of essentially the same composition as the casting, cooling the casting to ambient temperature slowly.

11. A method of repairing damaged aluminum castings comprising the steps of removing all material bounding the damaged portion of the casting, preheating the casting to at least 250° Fahrenheit, welding the damaged portion to provide complete fusion with said casting utilizing an inert gas and a filler rod of essentially the same composition as the casting, stress relieving the casting.

12. A method of repairing damaged aluminum castings comprising the steps of removing all material bounding the damaged portion of the casting, preheating the portion of the casting where the damage occurs to a temperature ranging from 250° to 1,000° Fahrenheit dependent upon the thickness of such portion, heating the portion of the casting where the damage occurs until such portion begins to become fluid, welding the damaged portion to provide complete fusion with said casting utilizing an inert gas and a filler rod of essentialy the same composition as the casting, stress relieving the casting.

13. A method of repairing damaged aluminum castings comprising the steps of removing all material bounding the damaged portion of the casting, preheating the portion of the casting where the damage occurs to a temperature ranging from 250° to 1,000° Fahrenheit dependent upon the thickness of such portion, welding the damaged portion to provide complete fusion with said casting utilizing an inert gas and a filler rod of essentially the same composition as the casting, allowing the casting to return to ambient temperature, reworking the repaired portion to return the casting to its original configuration, stress relieving the casting.

References Cited

UNITED STATES PATENTS

| | | | |
|---|---|---|---|
| 2,301,513 | 11/1942 | Brewer | 29—402 |
| 2,537,533 | 1/1951 | Ingalls | 29—402 |
| 2,632,944 | 3/1953 | Kittelson | 29—402 |
| 2,751,671 | 6/1956 | Welch et al. | 29—402 |
| 3,192,618 | 7/1965 | Altgelt | 29—402 |
| 3,246,392 | 4/1966 | Altgelt | 29—402 |

THOMAS H. EAGER, *Primary Examiner.*

U.S. Cl. X.R.

29—156.4, 528